(12) United States Patent
Potapenko et al.

(10) Patent No.: US 11,867,243 B2
(45) Date of Patent: Jan. 9, 2024

(54) FRICTIONAL BRAKE ELEMENT FOR A FRICTION BRAKE OF A MOTOR VEHICLE, FRICTION BRAKE, AND METHOD FOR PRODUCING A FRICTIONAL BRAKE ELEMENT

(71) Applicant: Robert Bosch GmbH, Stuttgart (DE)

(72) Inventors: Ilja Potapenko, Biedenkopf (DE); Christian Schnatterer, Oberursel (DE); Kangjian Wu, Marburg (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 17/609,896

(22) PCT Filed: May 15, 2020

(86) PCT No.: PCT/EP2020/063588
§ 371 (c)(1),
(2) Date: Nov. 9, 2021

(87) PCT Pub. No.: WO2020/234144
PCT Pub. Date: Nov. 26, 2020

(65) Prior Publication Data
US 2022/0221015 A1    Jul. 14, 2022

(30) Foreign Application Priority Data
May 18, 2019    (DE) ............... 10 2019 207 292.5

(51) Int. Cl.
*F16D 65/12*    (2006.01)
*B23K 26/00*    (2014.01)
(Continued)

(52) U.S. Cl.
CPC ........ *F16D 65/125* (2013.01); *B23K 26/0006* (2013.01); *F16D 65/127* (2013.01);
(Continued)

(58) Field of Classification Search
CPC ... F16D 65/123–128; F16D 2200/0013; F16D 2200/0078; B23K 26/0006;
(Continued)

(56) References Cited

U.S. PATENT DOCUMENTS 3,478,849 A * 11/1969 Heinz .................. F16D 65/125
                                                      188/218 XL
8,877,296 B2 * 11/2014 Lembach .............. F16D 65/127
                                                           427/451
(Continued)

FOREIGN PATENT DOCUMENTS

DE        103 45 000 B3    1/2005
DE   10 2004 054 193 A1    6/2006
(Continued)

OTHER PUBLICATIONS

International Search Report corresponding to PCT Application No. PCT/EP2020/063588, dated Jul. 21, 2020 (German and English language document) (6 pages).

*Primary Examiner* — Christopher P Schwartz
(74) *Attorney, Agent, or Firm* — Maginot, Moore & Beck LLP

(57) ABSTRACT

The disclosure relates to a frictional brake element for a friction brake of a motor vehicle, in particular brake disk, having a main element which is manufactured in particular from grey cast iron and which has at least one wear protection layer applied to the main element and at least one intermediate layer situated between the wear protection layer and the main element. It is provided that the intermediate layer is a metallic intermediate layer applied by laser deposition welding.

9 Claims, 2 Drawing Sheets

(51) Int. Cl.
 *B23K 103/18* (2006.01)
 *B23K 101/00* (2006.01)
 *B23K 103/02* (2006.01)

(52) U.S. Cl.
 CPC .... *B23K 2101/006* (2018.08); *B23K 2103/02* (2018.08); *B23K 2103/26* (2018.08); *F16D 2200/0013* (2013.01); *F16D 2200/0078* (2013.01)

(58) Field of Classification Search
 CPC ............ B23K 2103/02; B23K 2103/26; B23K 2101/006; C23C 28/027; C23C 4/02
 USPC .......................................... 188/18 A, 218 XL
 See application file for complete search history.

(56) References Cited

U.S. PATENT DOCUMENTS

| | | | | |
|---|---|---|---|---|
| 9,638,276 | B2* | 5/2017 | Schluck | B23K 26/354 |
| 10,260,585 | B2* | 4/2019 | Saga | B61H 5/00 |
| 11,215,251 | B2* | 1/2022 | Kwon | C23C 8/02 |
| 11,339,841 | B2* | 5/2022 | Rettig | C23C 28/027 |
| 2007/0286961 | A1* | 12/2007 | Pahle | C23C 4/02 |
| | | | | 188/218 XL |
| 2009/0026025 | A1* | 1/2009 | Hampton | F16D 65/127 |
| | | | | 188/218 XL |
| 2011/0293849 | A1 | 12/2011 | Lembach et al. | |
| 2017/0122392 | A1* | 5/2017 | Lembach | F16D 69/04 |
| 2017/0122393 | A1* | 5/2017 | Grabiec | F16D 65/128 |
| 2020/0072307 | A1 | 3/2020 | Rettig et al. | |
| 2020/0182318 | A1* | 6/2020 | Kang | C21D 3/04 |
| 2020/0378459 | A1* | 12/2020 | Carminati | C23C 4/10 |
| 2022/0213940 | A1* | 7/2022 | Potapenko | F16D 69/027 |

FOREIGN PATENT DOCUMENTS

| | | |
|---|---|---|
| DE | 10 2009 008 114 A1 | 8/2010 |
| DE | 10 2017 212 706 A1 | 1/2019 |
| DE | 10 2018 116 112 A1 | 1/2019 |
| DE | 10 2017 218 580 A1 | 4/2019 |
| EP | 3 034 902 A1 | 6/2016 |
| JP | 2014-161858 A | 9/2014 |
| JP | 2015-505940 A | 2/2015 |
| JP | 2015-55351 A | 3/2015 |
| WO | WO-2021254857 A1 * 12/2021 | ........... F16D 65/125 |
| WO | WO-2021254858 A1 * 12/2021 | |

* cited by examiner

FRICTIONAL BRAKE ELEMENT FOR A FRICTION BRAKE OF A MOTOR VEHICLE, FRICTION BRAKE, AND METHOD FOR PRODUCING A FRICTIONAL BRAKE ELEMENT

This application is a 35 U.S.C. § 371 National Stage Application of PCT/EP2020/063588, filed on May 15, 2020, which claims the benefit of priority to Serial No. DE 10 2019 207 292.5, filed on May 18, 2019 in Germany, the disclosures of which are incorporated herein by reference in their entirety.

The disclosure relates to a friction brake element for a friction brake of a motor vehicle, in particular brake disk, having a main element made, in particular, of gray cast iron, having an antiwear layer applied to the main element and having an intermediate layer located between the antiwear layer and the main element.

The disclosure further relates to a friction brake for a motor vehicle, having at least one brake disk and at least one movable brake pad assigned to the brake disk and also a process for producing the above-described friction brake element.

BACKGROUND

Friction brakes for motor vehicles usually have, as friction brake elements, a brake disk and at least one brake pad having a brake lining, with the brake pad being pressed against the brake disk to achieve a braking effect. The brake disk is usually fixed to a wheel of the motor vehicle for rotation therewith and the brake pad is arranged so as to be movable but is fixed to the vehicle body. When the brake pad is pressed against the brake disk, abrasion occurs on the brake disk due to the frictional contact between brake pad and brake disk, leading to wear of the brake disk and to brake dust which gets into the environment. To reduce this wear, it is known that the friction brake element can be provided with an antiwear layer at least in the contact region with the brake pad. For example, application of antiwear layers based on hard metals or carbides to a main element of the friction brake element made of gray cast iron is known. Furthermore, provision of an intermediate layer between the antiwear layer and the main element so as to act, in particular, as bonding agent and anticorrosion layer between the antiwear layer and the main element is known.

SUMMARY

The friction brake element according to the disclosure having the features disclosed herein has the advantage that adhesion of the antiwear layer to the intermediate layer and also the resistance to cracking and the corrosion resistance of the friction brake element are improved. According to the disclosure, the intermediate layer is for this purpose a metallic intermediate layer and is applied by laser buildup welding to the main element.

In particular, the metallic intermediate layer is a nickel-, cobalt- or iron-based alloy. Crack growth and corrosion in the layer system of the friction brake element are avoided because of the low porosity which can be achieved by means of laser buildup welding and the resulting high cracking resistance of this intermediate layer. In addition, the laser buildup welding ensures that good layer adhesion between the intermediate layer and the main element is achieved due to the substance-to-substance bonding and secondly between the antiwear layer and the intermediate layer due to a preferably high surface roughness of the intermediate layer applied by means of laser buildup welding and the high bonding force resulting therefrom.

The surface of the intermediate layer facing the antiwear layer has particularly preferably been thermally pretreated, giving even better adhesion of the antiwear layer to the intermediate layer. In particular, the surface of the intermediate layer is cleaned by the pretreatment, for example by means of laser beam treatment.

In a preferred further development of the disclosure, the metallic intermediate layer has an at least two-phase microstructure. The different phases result in an increase in the fracture toughness of the intermediate layer because crack propagation is inhibited at the transition from one phase into the adjacent phase by the different configurations of the phases.

The respective phase preferably makes up at least 5% by volume of the intermediate layer. This gives an advantageous microstructure which increases the fracture toughness.

Furthermore, the antiwear layer is preferably an antiwear layer applied by thermal spraying or laser buildup welding to the intermediate layer. The antiwear layer is thus also preferably applied to the intermediate layer by laser buildup welding, which results in a low-cost production process in the production of the layer system.

In a preferred further development of the disclosure, the antiwear layer is configured as ceramic coating or as iron-based alloy having embedded hard material particles consisting of carbides, oxides, nitrides or borides. The above-mentioned additives reinforce the iron-based alloy and make it abrasion-resistant. The layer thickness of the intermediate layer is particularly preferably at least twice the average particle size of the hard material particles embedded in the antiwear layer. As a result, effective protection against corrosion is ensured by a closed, impervious intermediate layer even when a hard material particle is unintentionally incorporated in the intermediate layer during manufacture.

The friction brake of the disclosure having the features disclosed herein is characterized by the brake disk being configured as friction brake element according to the disclosure. This results in the advantages mentioned above.

The process of the disclosure having the features disclosed herein is characterized by the metallic intermediate layer being applied by laser buildup welding to the main element. This results in the advantages mentioned above.

Further advantages and preferred embodiments may be derived, in particular, from the disclosure and from the above description.

In particular, the main element is made of gray cast iron. Preference is given to the metallic intermediate layer being applied first to the main element and then the antiwear layer preferably being applied. The main element is preferably pretreated mechanically or thermally, in particular in order to satisfy the geometric requirements, before application of the intermediate layer. The intermediate layer is preferably also pretreated thermally, in particular cleaned, for example by means of laser beam treatment, in order to ensure good layer adhesion between the antiwear layer and the intermediate layer, before application of the antiwear layer. In particular, a nickel-, cobalt- or iron-based alloy is applied as intermediate layer to the main element. In this case, the intermediate layer is preferably produced in such a way that it has an at least two-phase microstructure in order to increase the fracture toughness. The intermediate layer is preferably produced in such a way that the respective phase makes up at least 5% by volume of the intermediate layer.

The antiwear layer is preferably applied to the intermediate layer by laser buildup welding or thermal spraying, in particular as ceramic coating or as iron-based alloy and in particular with embedded hard material particles which preferably consist of carbides, oxides, nitrides or borides.

BRIEF DESCRIPTION OF THE DRAWINGS

The disclosure will be illustrated in more detail below with the aid of the drawing. The figures show.

DETAILED DESCRIPTION

Figure 1:
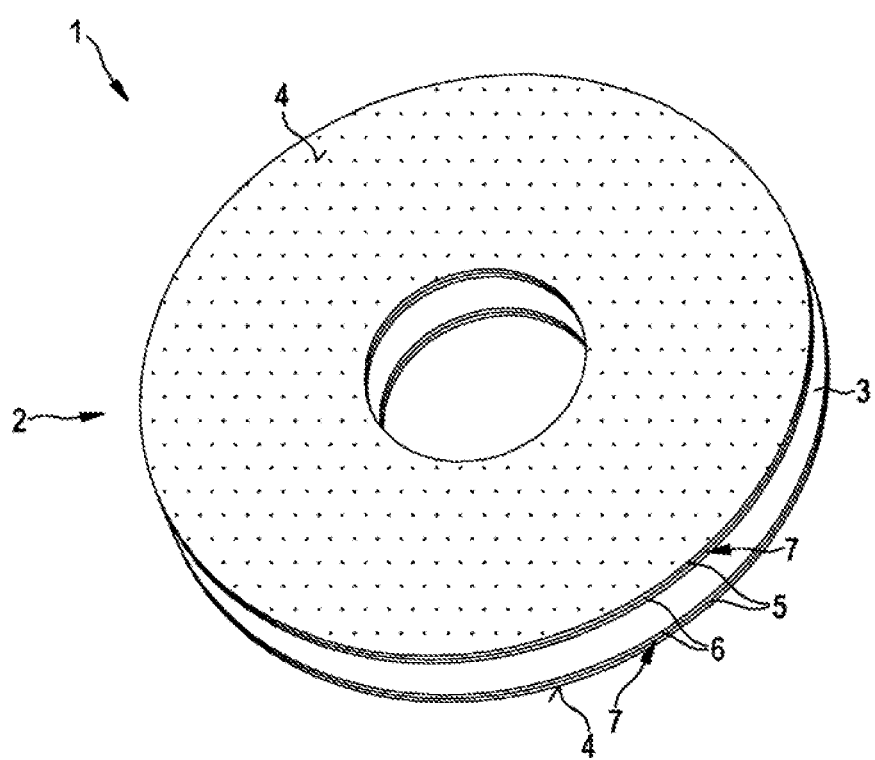
FIG. 1 an advantageous friction brake element in a simplified perspective depiction, FIG. 2 a simplified depiction of a production process for the frictional brake element and FIG. 3 a flow diagram to explain the production process.

FIG. 1 shows, in a simplified perspective depiction, a friction brake element 1 configured as a brake disk 2 for a friction brake, which is not shown in more detail here, of a motor vehicle. The friction brake element 1 has a circular main element 3 made of gray cast iron. A brake disk chamber which is optionally present on the brake disk 2 is not shown in FIG. 1. On each of its two faces, the main element 3 has an annular frictional contact surface 4 which is formed by an antiwear layer 5 of the friction brake element 1. The antiwear layer 5 forms, in correct operation, a frictional contact partner for at least one brake pad or brake lining of the friction brake, which for carrying out a braking operation is pressed against the frictional contact surface 4 to achieve friction braking. The brake disk 2 is usually fixed to a wheel of the motor vehicle for rotation therewith, while the brake pad is fixed to the housing and can be moved only in the direction of the brake disk 2. The relative movement of brake disk 2 and brake pad results, when the brake pad is pressed against the frictional contact surface 4, in abrasion on the friction brake element 1, leading to wear of the friction brake element 1 and to brake dust which enters into the surroundings of the motor vehicle.

The antiwear layer 5 reduces this wear and increases the abrasion resistance of the friction brake element 1. In particular, the antiwear layer is configured as ceramic coating or as iron-based alloy which has embedded hard material particles consisting of carbides, oxides, nitrides or borides, in order to ensure the abovementioned advantages.

To ensure reliable adhesion of the antiwear layer 5 to the main element 3, a metallic intermediate layer 6 is provided between the antiwear layer 5 and the main element 3. The intermediate layer 6 is applied by laser buildup welding to the main element 3.

Figure 2:
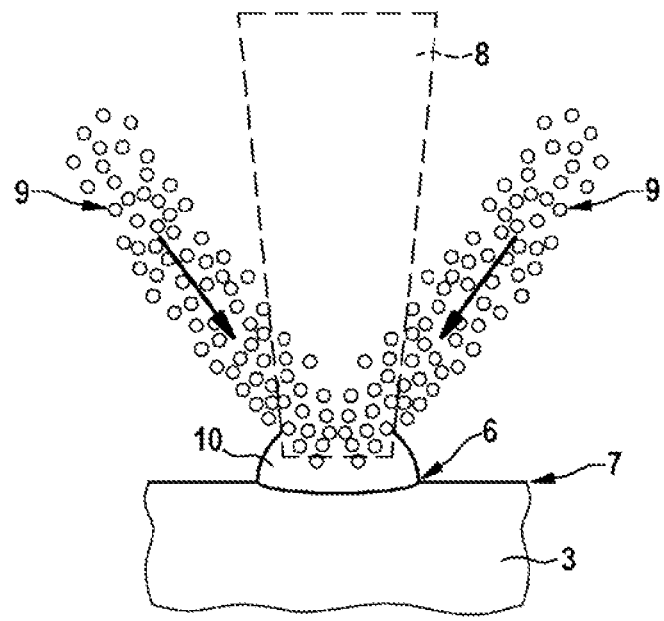

In this respect, FIG. 2 shows the process of laser buildup welding in a simplified sectional depiction. Here, an outer layer 7 of the main element 3 is heated by a laser beam 8 so that the outer layer 7 melts. At the same time, a supplementary material 9 for producing the metallic intermediate layer as nickel-, cobalt- or iron-based alloy is melted by the laser beam and subsequently mixed with the melted outer layer 7 so that, in particular, a welding bead 10 which forms the intermediate layer 6 is formed.

The antiwear layer 5 is, in particular, likewise applied by means of laser buildup welding to the intermediate layer 6 produced in this way.

The metallic intermediate layer 6 is preferably applied to the main element 3 in such a way that it has an at least two-phase microstructure. In particular, the phases each make up at least 5% by volume of the intermediate layer in order to ensure advantageous cracking resistance or fracture toughness of the intermediate layer. As a result of the presence of different phases, a crack which is being formed is stopped or inhibited at the transition from one phase into the adjacent phase, so that crack propagation through the intermediate layer 6 is advantageously prevented.

Figure 3:
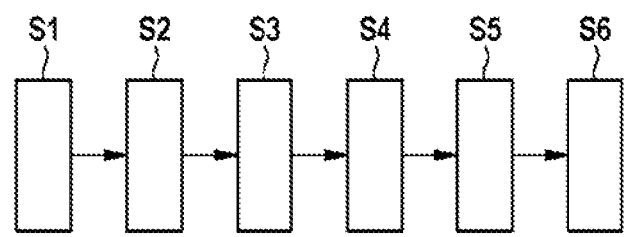

FIG. 3 shows an advantageous process for producing the friction brake element 1 with the aid of a flow diagram. In a first step S1, the main element 3 is provided. The main element is, as mentioned above, preferably made of gray cast iron. In a subsequent step S2, at least one face of the main element 3 is preworked or pretreated mechanically or thermally, in particular for roughening or geometric adaptation of the surface to which the metallic intermediate layer 6 is to be applied. The metallic intermediate layer 6 is subsequently applied in a step S3 to the face of the main element 3 by laser buildup welding. In particular, the intermediate layer is a nickel-, cobalt- or iron-based alloy. The substance-to-substance bonding resulting from laser buildup welding ensures that advantageous layer adhesion of the intermediate layer 6 to the main element 3 is achieved. Subsequently, after the intermediate layer 6 has solidified or cooled sufficiently, the intermediate layer 6 is optionally pretreated thermally on its free surface in a step S4, for example by means of laser beam treatment. The antiwear layer 5 is subsequently applied to the intermediate layer 6 in a step S5, in particular by means of laser buildup welding or thermal spraying. As mentioned above, the antiwear layer 5 is, in particular, configured as iron-based alloy comprising carbides, oxides, nitrides or borides to increase the wear resistance, or as ceramic coating.

The finished friction brake element 1 is subsequently obtained in a step S6. The antiwear layer 5 is optionally after-treated mechanically or thermally, in particular ground, in order to ensure a desired surface roughness for interaction with the brake pad of the friction brake.

The invention claimed is:

1. A friction brake element for a friction brake disk of a motor vehicle, comprising:
    a main element made of gray cast iron;
    at least one antiwear layer applied to the main element; and
    at least one intermediate layer located between the antiwear layer and the main element, wherein the at least one intermediate layer is a metallic intermediate layer applied by laser buildup welding,
   wherein
    the at least one antiwear layer is configured as one of ceramic coating and iron-based alloy, the at least one antiwear layer having embedded hard material particles consisting of carbides, oxides, nitrides or borides, and
    a layer thickness of the at least one intermediate layer is at least twice an average particle size of the hard material particles embedded in the at least one antiwear layer.

2. The friction brake element as claimed in claim 1, wherein the at least one intermediate layer has an at least two-phase microstructure.

3. The friction brake element as claimed in claim 2, wherein each of the respective phases of the at least two-phase microstructure makes up at least 5% by volume of the at least one intermediate layer.

4. The friction brake element as claimed in claim 1, wherein the at least one intermediate layer is one of a nickel-based alloy, a cobalt-based alloy, and an iron- based alloy.

5. The friction brake element as claimed in claim 1, wherein the at least one antiwear layer is an antiwear layer applied by one of thermal spraying on and laser buildup welding to the intermediate layer.

6. The friction brake element as claimed in claim 1, wherein a surface of the at least one intermediate layer facing the at least one antiwear layer has been pretreated thermally.

7. A friction brake for a motor vehicle, having at least one brake disk and at least one movable brake pad assigned to the brake disk, wherein the brake disk is configured as friction brake element as claimed in claim 1.

8. A process for producing a friction brake element for a friction brake of a motor vehicle, comprising:
- providing a main element made of gray cast iron;
- applying at least one metallic intermediate layer by laser buildup welding to the main element; and
- providing at least one antiwear layer on a side of the at least one metallic intermediate layer opposite the main element, wherein:
- hard material particles are embedded in the at least one antiwear layer, and
- the at least one intermediate layer is applied to the main element in such a way that a layer thickness of the at least one intermediate layer is at least twice an average particle size of the hard material particles embedded in the at least one antiwear layer.

9. The process as claimed in claim 8, wherein the at least one intermediate layer is applied to the main element in such a way that it has an at least two-phase microstructure.

\* \* \* \* \*